J. LEDWINKA.
JIG FOR USE IN ELECTRICALLY WELDING THE PARTS OF AUTOMOBILE BODIES AND OTHER STRUCTURES.
APPLICATION FILED JULY 1, 1919.
1,415,588.
Patented May 9, 1922.
6 SHEETS—SHEET 1.
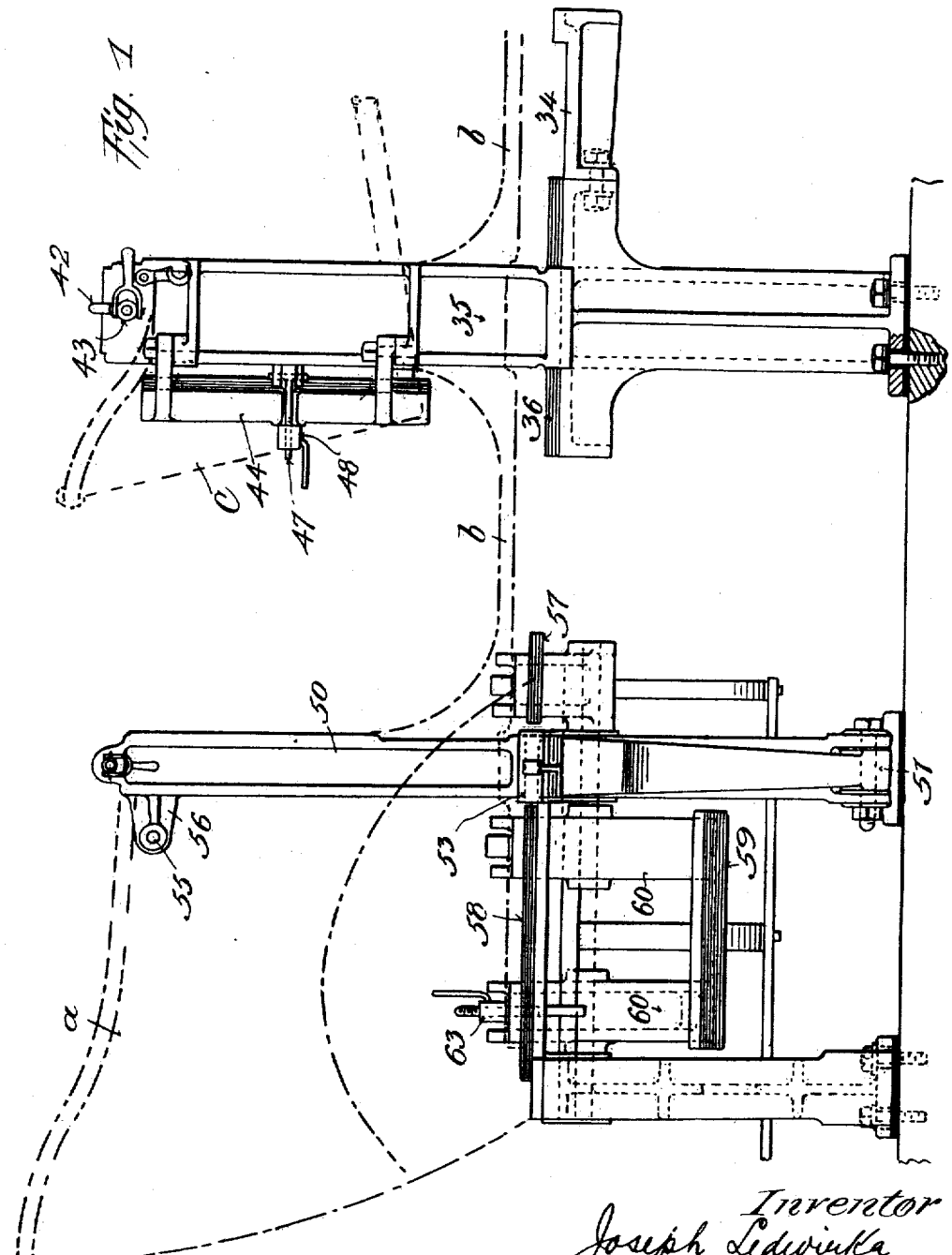

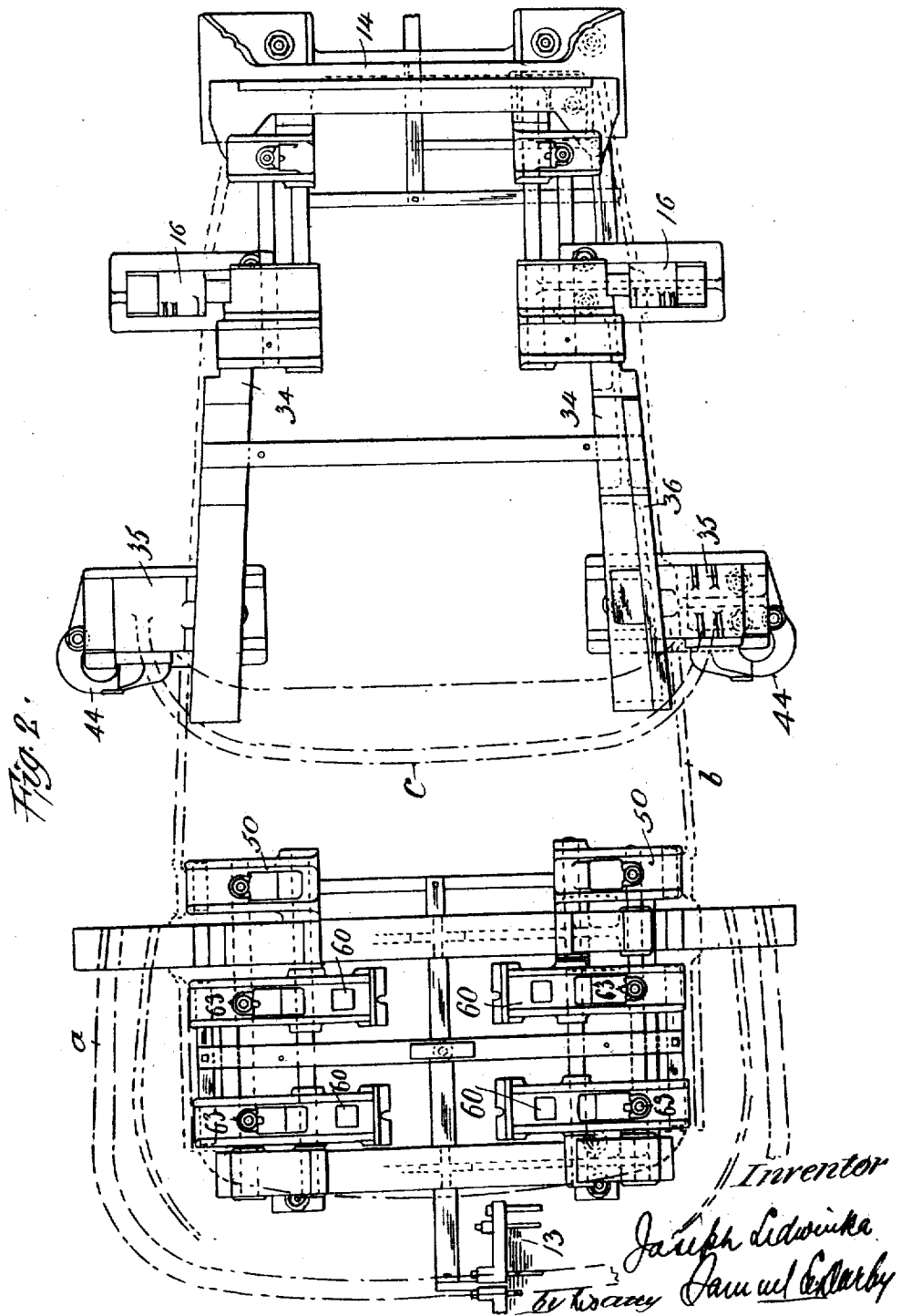

J. LEDWINKA.
JIG FOR USE IN ELECTRICALLY WELDING THE PARTS OF AUTOMOBILE BODIES AND OTHER STRUCTURES.
APPLICATION FILED JULY 1, 1919.
1,415,588.
Patented May 9, 1922.
6 SHEETS—SHEET 3.
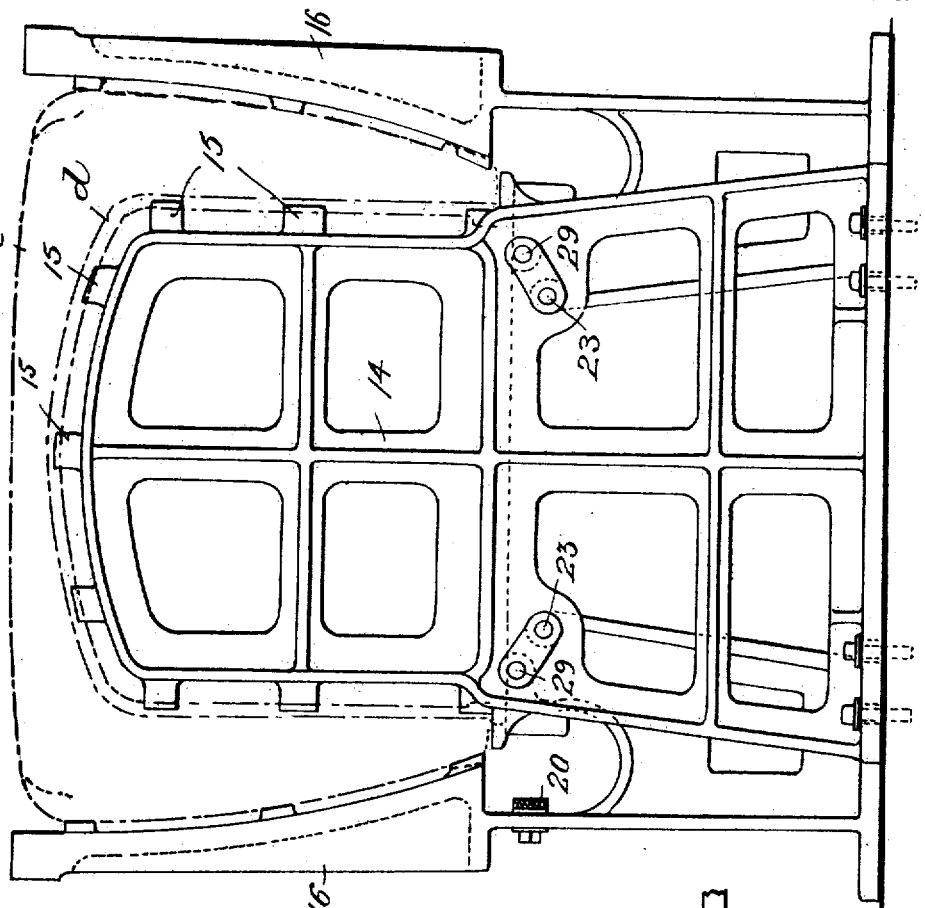
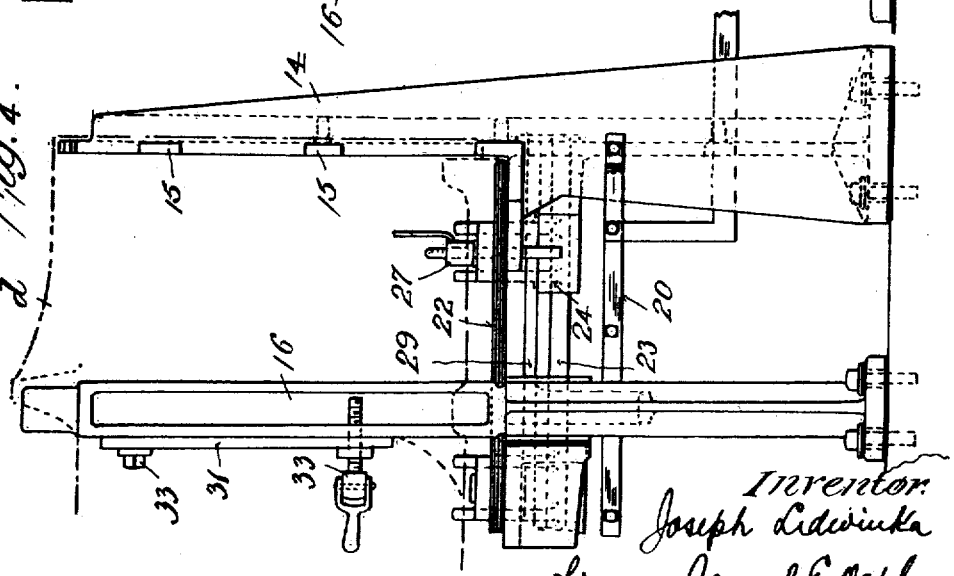

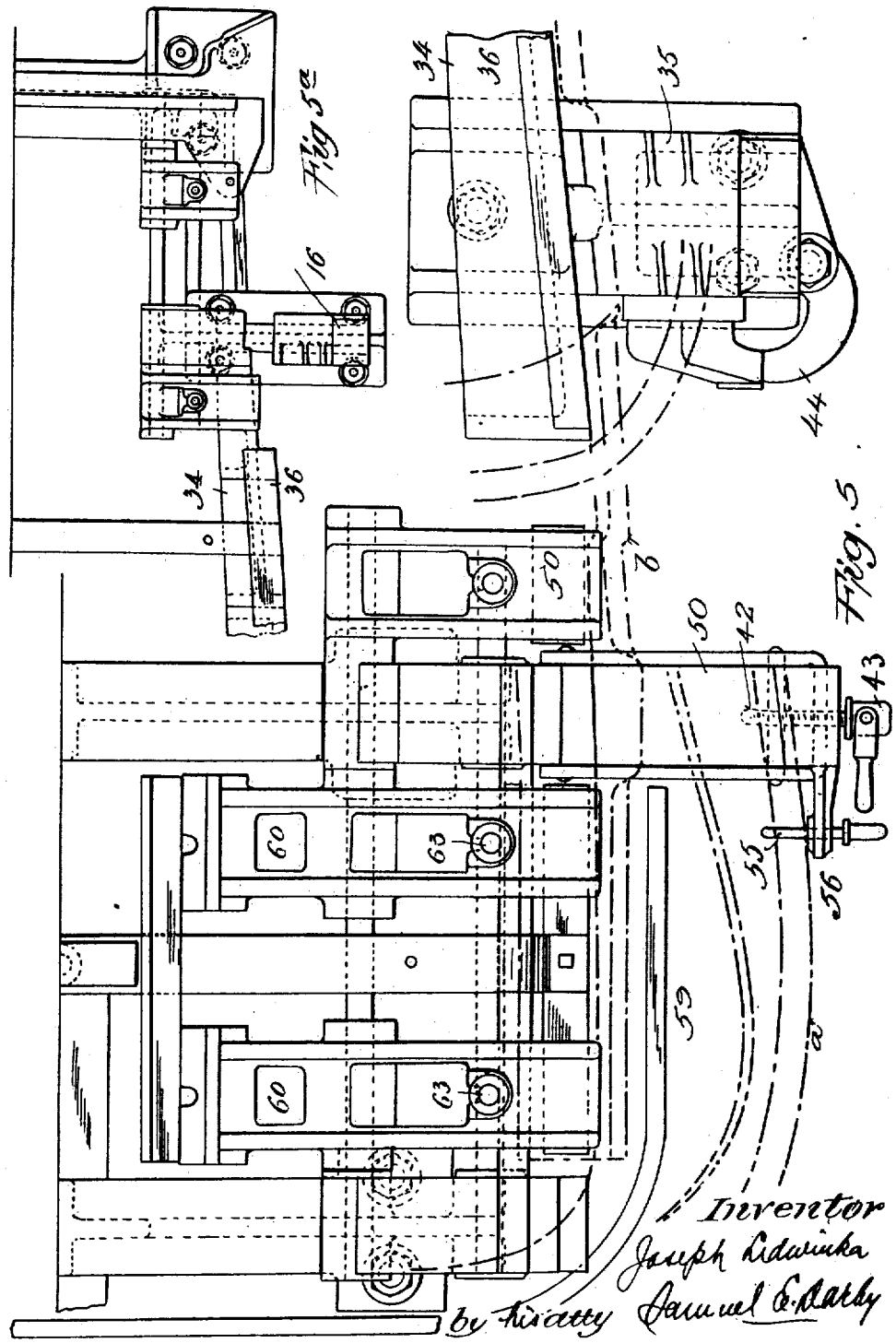

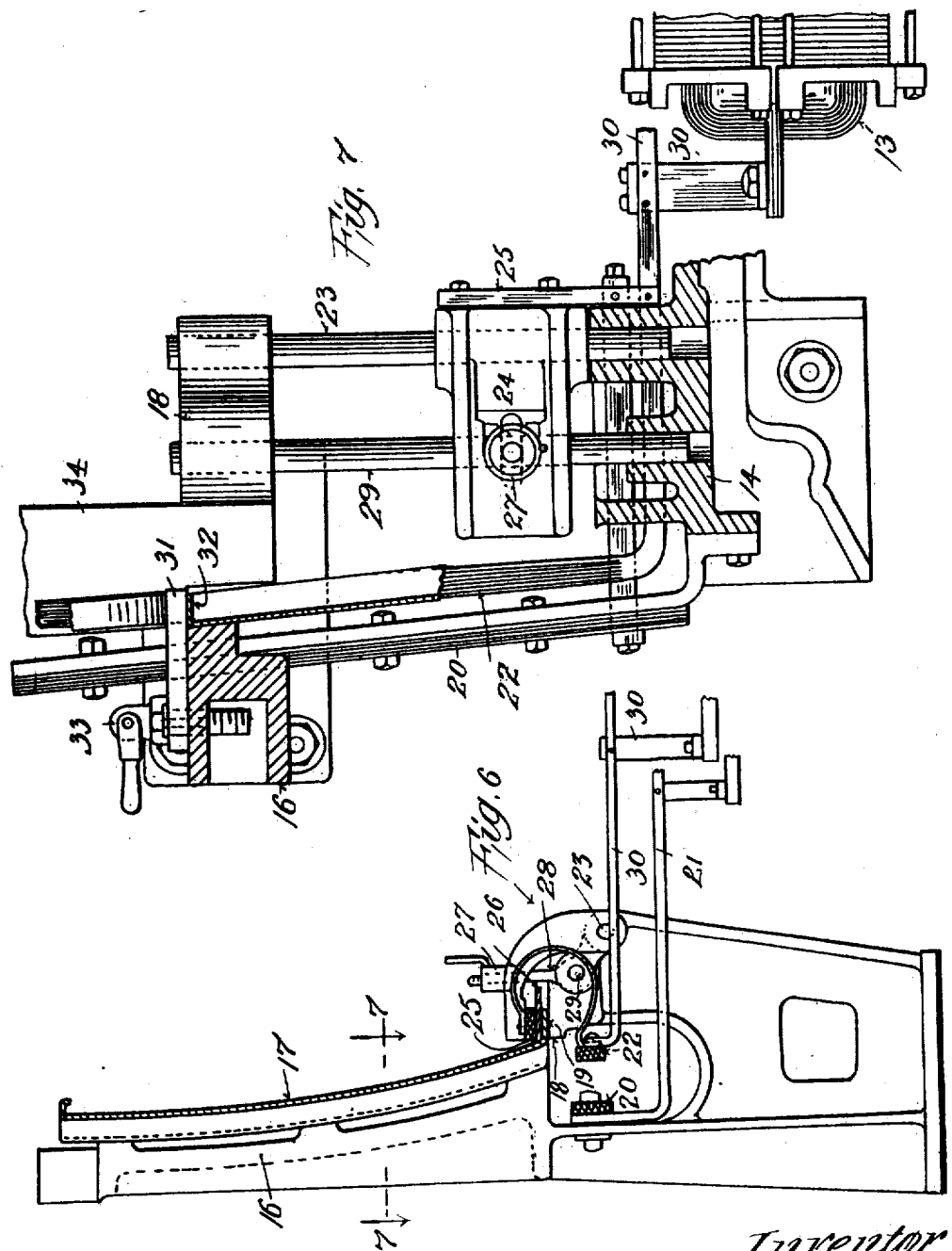

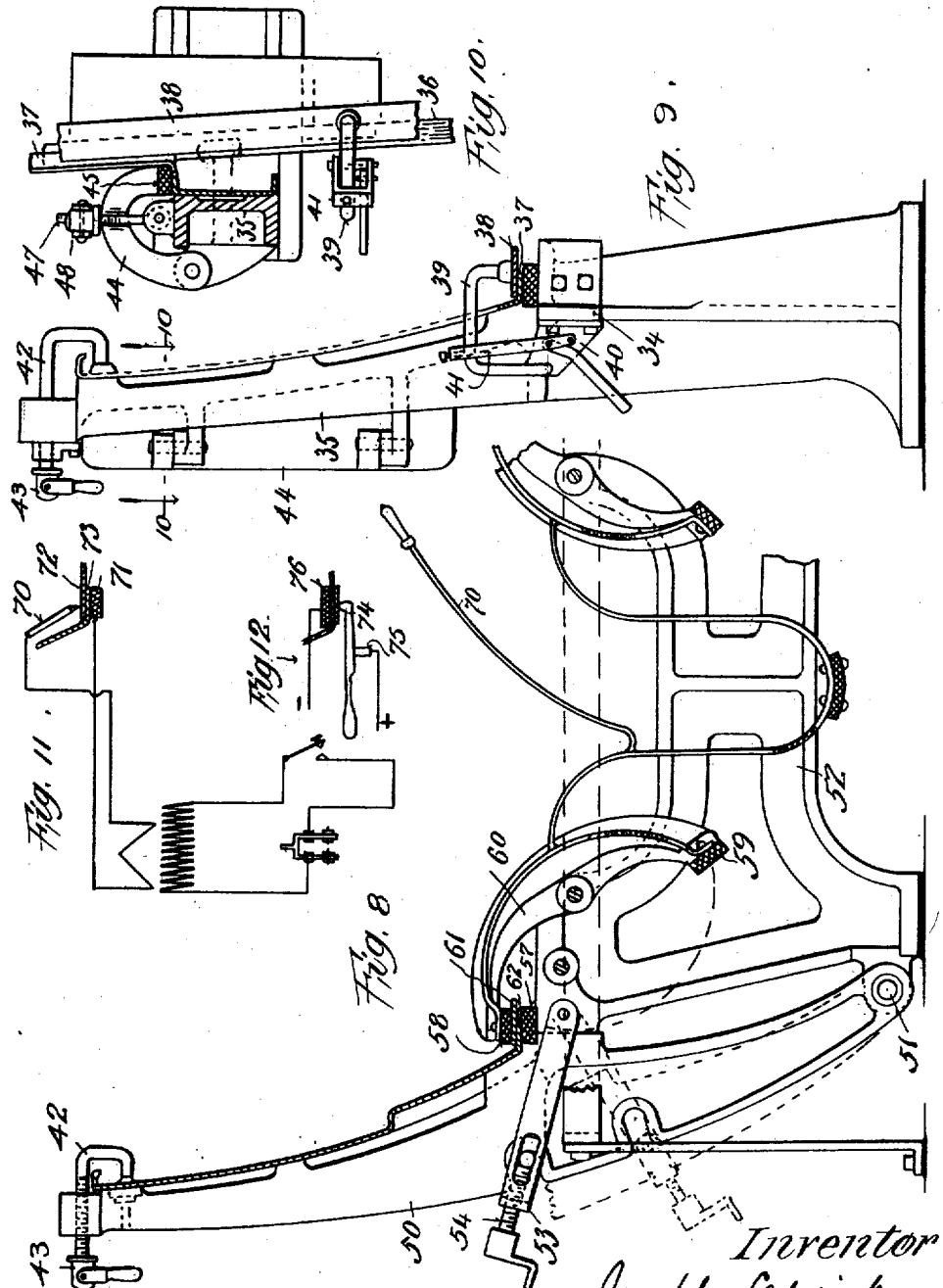

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

JIG FOR USE IN ELECTRICALLY WELDING THE PARTS OF AUTOMOBILE BODIES AND OTHER STRUCTURES.

1,415,588.     Specification of Letters Patent.     Patented May 9, 1922.

Application filed July 1, 1919. Serial No. 307,920.

*To all whom it may concern:*

Be it known that I, JOSEPH LEDWINKA, a citizen of the United States, residing at Philadelphia, in the county of Philadelphia, State of Pennsylvania, have made a certain new and useful Invention in Jigs for Use in Electrically Welding the Parts of Automobile Bodies and Other Structures, of which the following is a specification.

This invention relates to jigs for use in assembling and electrically welding together the parts of an automobile body and other structures.

The object of the invention is to provide a jig of the nature referred to which is simple in structure and efficient in operation, and by the use of which the assembly and welding together of the parts of an automobile body or other structure is greatly simplified and expedited.

A further object of the invention is to provide a jig or assembly machine of the nature referred to wherein the parts to be welded together may be quickly and easily assembled in proper position and relation and welded together at the various points required to be welded.

Other objects of the invention will appear more fully hereinafter.

The invention consists substantially in the construction, combination, location, and relative arrangement of parts all as will be more fully hereinafter set forth as shown in the accompanying drawing and finally pointed out in the appended claims.

Referring to the accompanying drawings:—

Fig. 1 is a view in side elevation of the rear portions of a jig embodying the principles of my invention showing in dotted lines the application of an automobile body thereto.

Fig. 2 is a top plan view of the complete machine.

Fig. 3 is a view in front end elevation.

Fig. 4 is a view in side elevation of the front end of the machine.

Fig. 5 is a top plan view of a portion of the rear end of the machine.

Fig. 5ᴬ is a view similar to Fig. 5 of the front end of the machine.

Fig. 6 is a view in front end elevation of a portion of the left hand side of the machine, the parts to be welded being shown in transverse section, and in position to be welded.

Fig. 7 is a view in transverse horizontal section on the line 7, 7, Fig. 6, looking in the direction of the arrows.

Fig. 8 is a rear end elevation of the right hand side of the machine looking forwardly, parts broken off, the parts to be welded being shown in transverse section and in position to be welded.

Fig. 9 is a view in rear end elevation of the right hand side of the central body supporting post and its attachments.

Fig. 10 is a view in transverse horizontal section on the line 10, 10, Fig. 9, looking in the direction of the arrows.

Fig. 11 is a view in diagram illustrating an electric welding circuit employed in effecting the welding operation.

Fig. 12 is a similar view illustrating another method of effecting the welding operation.

The same part is designated by the same reference numeral wherever it occurs throughout the several views.

In the manufacture of sheet metal automobile bodies, and other structures, the time required to assemble and weld together the various parts composing the body or structure constitutes a very important element in the cost of manufacture, and the efficiency with which the parts of the body or structure are secured together constitutes an important feature in determining and establishing the value of the body when manufactured.

It is among the special purposes of my present invention to provide an apparatus in which the various sheet metal parts required to make up a complete body or other structure are easily and quickly assembled together in the required relative positions thereof, and while in such assembled relation and retained or held in place, are electrically welded, thereby not only reducing the time required to complete the body or other structure but also accomplishing an effective joining together of the various parts of the structure.

In practice the various parts of an automobile body, for example, are stamped out of sheet metal. Usually and ordinarily in modern practice there are stampings for the tonneau body or rear seat indicated in dotted lines at $a$, Figs. 1 and 2, the side panel or stamping indicated at $b$, the front seat panel or stamping $c$, and the cowl or shroud panel or stamping $d$. In addition to these principal stampings there are other stampings for the seat frames, reinforcing panels or strips, spacer struts or members, channel door post stampings, etc. To produce the complete body it is necessary to secure together these various parts, panels or stampings, and the efficiency and desirability of the completed body is, of course, dependent upon the efficient joining together of the various parts and in proper position and relation with respect to each other. It has been found in practice that the best results are obtained by electrically welding together the various parts composing the complete body. Another problem which materially controls the cost of manufacture of the bodies is the speed or rapidity with which the various parts required to form a complete body may be assembled together in their proper position and relation and welded together while held or retained in their assembled relation. Moreover, when the parts to be joined are assembled in proper relation it is frequently necessary to accomplish the welding operation at points which are difficult of access. It is therefore also among the special purposes of my present invention to provide a jig or assembling machine in which the various parts composing the complete body may be quickly assembled together, held in proper relation, and welded together at the required points, even where such points may be difficultly accessible.

In the accompanying drawing I have shown a construction of jig or assembly machine embodying my invention, and by the use of which the objects and purposes above set forth, and others hereinafter mentioned, are accomplished, efficiently and speedily.

Generally the machine is divided into sections, namely, that in which the parts constituting the tonneau, or rear seat, of the body are assembled, and which I will refer to as the rear end of the machine; that in which the parts constituting the front seat are assembled, and which I will refer to as the central part of the machine; and that in which the parts constituting the shroud or cowl are assembled, and which I will refer to as the front end of the machine.

In carrying out my invention I derive electric welding current from suitable transformers, the leads of the secondaries of which are incorporated in the jig structure at the necessary points to accomplish the welding operations throughout the assembled parts composing the entire body to be welded. In the particular arrangement shown, to which, however, my invention is not to be limited or restricted a transformer is associated with each end of the jig frame. It is obvious, however, that welding current may be supplied from any suitable or convenient source. The transformers, in the arrangement shown, are indicated at 13, see Figs. 2 and 7, and may be of any desired structure.

The front end of the apparatus includes a vertical transversely extending end frame 14, see Figs. 2, 3, 4, and 5^A, which forms an abutment against which fits the front end of the stamping or panel constituting the shroud or cowl. For this purpose the end frame 14 is formed with lugs 15 see Figs. 3 and 4, which receive and form gauge stops for the front edge of the shroud or cowl stamping. Adjacent the end frame 14 is a vertical standard or side frame member 16, one at each side of the machine, against the inside vertical wall of which lies the side of the stamping which forms a portion of the front door post of the body as indicated at 17. The standards 16 are provided with an inwardly projecting extension 18 upon which rests the lower edge flange 19 of the stamping of the cowl or shroud or side panel of the body, as clearly shown in Fig. 6. A conductor bar 20 extends along each side of the front end of the apparatus and is supported by or upon the standard 16. This conductor bar is suitably connected between connections 21 to one terminal of the secondary winding of the transformer and hence constitutes a lead in the circuit of the transformer secondary. The conductor bar 20 is utilized to complete the welding circuit at the points in the front end of the automobile body where welds are to be made, and, in practice, is located at a sufficient distance outside of and below the cowl, shroud or other stamping, when in position, to be removed from interference with the proper assembling of the stampings while at the same time permitting a conductor bar or other contactor to span the space between the conductor 20 and the parts to be welded in cooperation with suitable contacts or conductor members included in or connected to the circuit of the other terminal of the transformer secondary. The location of the conductor bar 20, as above described, permits electric welds to be made at points which are difficult of access when ordinary electric welding electrodes are employed.

Also extending along each side of the front end of the machine is a conductor bar 22, which likewise is connected through connections 30 to the other terminal of the transformer secondary circuit, and from which welding current may be applied in effecting the welding at various points of the parts to be welded. It is obvious that the conductor bars 20, 22, may be associated with either of the terminals of the transformer secondary, the important feature being that said bars as so disposed and located as to permit welding current to be supplied therefrom at the required points to weld together the assembled parts of the body.

Arranged inside the frame at its front end and adjacent to each side of the frame is a bar 23, see Fig. 7. This bar is supported at its ends respectively in the front end of the frame 14 and in the side standards 16. Upon bar 23 is carried a rock member 24 to which is secured a conductor member or bar 25 which is likewise connected electrically in the circuit of the secondary of the transformer. With this arrangement, when the flange 19 of panel 17 is to be welded to the member 26 of the automobile body, the latter being placed upon the upper surface of the inturned flange 19 as shown in Fig. 6, the member 29 may be rocked in position for the conductor bar 25 carried thereby to rest upon the upper surface of the member 26. The rock member 24 may slide along its supporting bar 23 so that the conductor bar 25 may be carried into any desired position where a weld is to be effected, lengthwise of the automobile body, within the limits of course afforded by the length of the supporting bar 23. When the member 24 is rocked over into position for use to effect a weld of the parts 26, 19, for example, it may be locked or clamped in welding position in any suitable manner preparatory to completing the welding circuit through the parts to be welded and at the points where welds are to be made. A simple and efficient releasable clamping means for this purpose is shown wherein a clamp nut 27 is carried by a stud 28 which is mounted to rock upon a supporting bar 29 carried at its ends in the end frame 14 and the extension 18 in parallel relation to the supporting bar 23. The stud 28 not only swings or rocks upon the supporting bar 29 but is movable or slidable along said bar so as to be carried into cooperating relation with respect to the rocking member 24 in whatever position of adjustment said member 24 may be shifted. The stud 28 with its clamp nut 27 may be rocked or swung into and out of position to engage the member 24 to clamp and release the latter as occasion may require.

The standards 16 are provided with lugs or projections, see Figs. 3 and 4, against which the stamping to be welded is held. On the rear sides of the standards 16, suitable face plates 31 are adjustably mounted for use in properly positioning and holding the stamping in place for the welding operation, particularly the inturned vertical flange 32 at the edge of the stamping, see Fig. 7. It will be seen that the plate 31 is adjustable to a point where it projects beyond the inner edge of the standard 16, and this forms an abutment against which the flange 32 lies. The plate 31 may be held in position in any suitable manner, as for instance, by bolts and clamp nuts 33.

Horizontally disposed side members 34 of the frame extend rearwardly from the standards 16 at each side of the frame to the frame standards 35. Upon these side members 34 rest the bottom edge flanges of the stamping to be welded, suitable conductors 36 being carried on members 34 and connected in the secondary circuit of the transformer. If desired the parts to be welded which lie upon the frame members 34 may suitably be clamped in place, particularly in the case of inturned flange 37 and plate 38 to be welded thereto, see Figs. 9 and 10. A simple clamp device for this purpose is shown consisting of a clamp arm 39 which is pivoted to a bracket 40, bolted to the frame side member 34, and which is held in clamping position by means of a releasable strap 41 adapted to engage thereover. Of course it is to be understood that other forms of releasable clamps will well answer the purpose, and also that a clamp device may be applied at any point where needed.

The stamping lies against and is supported by the inner side of the standards 35, and at its upper edge the stamping may be clamped in place by means of any suitable or convenient form of clamp device which is capable of easy application and release. A simple clamp device for this purpose is shown, consisting of a clamp bar 42 having a bent over end adapted to reach over the upper edge of the stamping for engagement with its inner surface, see Fig. 9. The bar 42 passes through an opening in the upper end of the standard 35 and a clamp nut 43 is applied to the threaded end thereof.

Hinged to the standards 35 on vertical axes are swinging gates 44 which are provided with vertical conducting strip 45, see Fig. 10. These gates are designed for use in welding together the parts of the body and front seat panels or stampings and the door post associated therewith, as clearly shown in Figs. 9 and 10, the swinging gates serving to clamp and release the parts to be welded. The gates are releasably held in their clamping relation by means of clamp rods 47 pivoted to the standards 35 and adapted to be thrown into engagement with the gate when closed into clamping position, and a clamp nut 48 applied thereto accomplishes the clamping action.

The parts to form the rear end or tonneau part of the body, see Figs. 1, 2 and 8, and particularly the tonneau stamping a, and its associated parts, are received and disposed between the standards 50, which are pivotally mounted at their lower ends, as shown at 51, see Fig. 8, upon a transversely extending portion 52 of the main frame. The standards 50 are pivoted to swing outwardly away from each other to release a body held therebetween after it is completed, and to swing towards each other to clamp and hold the parts to be welded when assembled in place between them. When swung inwardly towards each other to effect their clamping action, they are held in place by means of a strap 53 attached to the frame, and which embraces the rocking standard. A clamp screw 54 is threaded through the strap and engages the standard to swing and hold the latter in proper clamping or releasing position.

If desired the upper ends of the standards 50 may be provided with clamp devices for the stamping or panel, similar in all respects to the clamp bars 42 and clamp nuts 43 above described with reference to the standards 35.

If desired clamp or gage devices, such as indicated at 55, Fig. 5, may be mounted in brackets 56 carried by the standards 50 at their upper ends.

The rear portion of the frame carries the conductors employed for supplying welding current to the various points where welds are to be made. It will be understood, of course, that the particular location of these conductor bars will vary according to the particular structure and design of the complete body to be welded. This observation applies of course to the conductor bars already referred to. Consequently it is to be understood that my invention is not to be limited or restricted in respect to the location of the conductor bars, the important feature being to provide a welding machine or jig which is simple and in which the parts to form a complete body may be quickly assembled and welded together and the complete body removed and wherein the welds are made at any point where required.

As shown in the drawings I employ suitably disposed stationary conductor bars 57, and also conductor bars 58, 59, carried at opposite ends of a rocking frame 60, pivotally mounted in the frame work 52 of the machine, so that either conductor bar 58 or 59 may be brought into cooperative relation with respect to the parts to be welded and other circuit terminals to effect the welds. In this manner one of the conductor bars 58, for example, may be brought down on top of the parts 61, 62, to be welded, see Fig. 8, or the bar 59 may be brought into position underneath otherwise inaccessible parts to be welded. The conductor bars on the rocking frames 60 are to be properly connected up in the transformer circuit. The rocking frame 60 may be clamped in either of its working positions in any suitable manner. I have shown a clamp device 63 for this purpose, see Fig. 1 and 2. It will be understood, of course, that for the purpose of convenience one or more electrodes 70 for cooperating with the conductor bars, may be tapped off from any convenient point in the circuit of the secondary of the transformer, such electrodes being connected by flexible conductors, so that the electrode may be handled manually in cooperation with any of the conductor bars in effecting welds at various points. I have shown such a flexible carried and connected electrode at 70, Fig. 8.

Of course the supply of current to the primaries of the transformers is to be controlled in the usual and well known, or in any suitable, manner.

In Fig. 11 I have shown diagramatically the use of the flexibly carried electrode 70, in cooperation with a stationary conductor bar 71 in welding together the members 72, 73, it being understood of course that the electrode 70 is manipulated manually in applying the same at the point or points where welds are to be made. This electrode will be used where access is easy and convenient to the points where welds are to be made. It sometimes occurs that a weld is desired which is inaccessible to a conductor bar or to a flexibly supported electrode. In such case I have indicated in Fig. 12 the use of a spanning conductor lever 74 to span the space between conveniently located conductor bars 75, 76. Thus provision is made for effecting welds quickly and easily at even ordinarily inaccessible points.

It will, of course, be understood that spacer gages for the parts constituting opposite sides of the body to be welded may be employed in accordance with good shop practice.

From the foregoing description it will be seen that I provide an exceedingly simple and efficient welding machine or jig structure in which provision is made for quickly assembling and welding together the stampings, panels and other metal parts required to produce sheet metal automobile bodies. In extensive practical use of machines and jigs of the construction shown and described, I have found that the parts required for a complete body can be assembled and welded in the space of a few minutes where heretofore the same work has required hours. In the practical use of the machines the work of assembling and welding different parts of the same body may be carried out simultaneously. That is, while the cowl or shroud stampings are being assembled and welded to their associated parts by one or more workmen, the tonneau body panel or the front seat panel, or both, may also be assembled and welded by other workmen, without interference, thus materially expediting the work and reducing the time of producing a complete finished body.

It will also be seen that in the use of the machines or jigs the panels or stampings and other parts required for a complete body can be manufactured or stamped out in standard dimensions and carried in stock or shipped in knock-down or unassembled condition, and then assembled and welded into complete bodies at other convenient times, or in a different department of the factory, or at a distant assembly point. This results not only in great factory convenience, economy, and expedition, but also in greatly reduced cost of transportation.

Having now set forth the objects and nature of my invention, and a construction embodying the principles thereof, what I claim as new and useful, and of my own invention, and desire to secure by Letters Patent, is,—

1. In a machine for welding together sheet metal stampings to form an automobile body, an assembly frame to receive the stampings in position to be welded together, a rod carried by said frame, a rock member carried by said rod to rock thereon and shiftable therealong, a conductor bar carried by said rock member to be brought into contact with the portions of the stampings to be welded, and a movable electrode cooperating with said contact bar to effect the welding action at any desired point along the length of said bar, said bar and electrode forming parts of an electric welding circuit.

2. In a machine for welding together sheet metal stampings to form an automobile body, an assembly frame to receive the stampings in position to be welded together, a rod carried by said frame, a rock member carried by said rod to rock thereon and shiftable therealong, a conductor bar carried by said rock member to be brought into contact with the portions of the stampings to be welded, means for clamping said rock member with the conductor bar carried thereby in contact with the parts to be welded, and a movable electrode cooperating with said conductor bar to weld the stamping at any desired point along the length of said bar, said conductor bar and electrode forming parts of an electric welding circuit.

3. In a machine for welding together sheet metal stampings to form an automobile body, an assembly frame to receive the stampings in position to be welded together, a rod carried by said frame, a rock member carried by said rod to rock thereon and shiftable therealong, a conductor bar carried by said rock member to be brought into contact with the portions of the stampings to be welded, a clamp device also shiftable upon said frame to engage said rock member and hold the conductor bar in contact with the stamping parts, to be welded, and a movable electrode cooperating with said conductor bar to weld the stamping parts, said conductor bar and electrode forming parts of an electric welding circuit.

In testimony whereof I have hereunto set my hand on this 27th day of June, A. D. 1919.

JOSEPH LEDWINKA.